March 28, 1950 — E. D. SMITH ET AL — 2,502,285
WHEEL CHANGE DOLLY
Filed Aug. 19, 1946 — 2 Sheets-Sheet 1

INVENTORS:
Kenneth L. Smith
Elmo D. Smith
BY Victor J. Evans & Co.
ATTORNEYS

INVENTORS.
Kenneth L. Smith
Elmo D. Smith

Patented Mar. 28, 1950

2,502,285

UNITED STATES PATENT OFFICE 2,502,285

WHEEL CHANGE DOLLY

Elmo D. Smith and Kenneth L. Smith,
Eufaula, Okla.

Application August 19, 1946, Serial No. 691,475

1 Claim. (Cl. 254—10)

Our present invention relates to improvements in portable pushing and pulling implements of the hoisting or elevating type, and more specifically to a wheel-changing dolly of the type employing elevating means and a single throw lever mechanism for elevating and lowering the supported wheels of automotive trucks, buses, and similar vehicles.

While the dolly of our invention is well adapted for various uses and purposes, it is especially designed to facilitate the handling and servicing of large truck and bus wheels and hub assemblies; and our invention provides a strong, rugged, and durable dolly that is simple in construction, and which may be manipulated with convenience for the performance of its various functions.

The invention consists in certain novel combinations and arrangements involving a compactly arranged wheel-base and elevating and lowering mechanism actuated by a single throw of the dolly-handle as will hereinafter be more fully set forth and claimed. In the accompanying drawings we have illustrated one complete example of the physical embodiment of our invention wherein the parts are combined and arranged according to one mode we have thus far devised for the practical application of the principles of our invention, but it will be understood that changes and alterations may be made in these exemplifying drawings and mechanical structures, within the scope of our claim, without departing from the principles of our invention.

Figure 1:
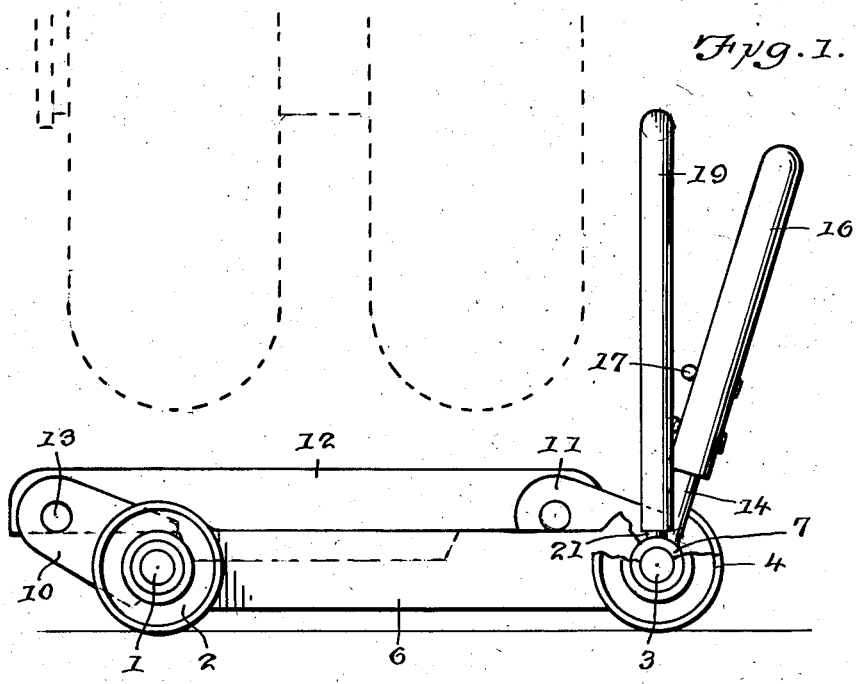
Figure 1 is a view in side elevation of a dolly in which our invention is embodied with its elevating mechanism in lowered position; and indicating by dotted lines dual wheels of a truck jacked-up for removal.

In the preferred form of the invention shown in the drawings we have illustrated the wheel-base as equipped with four wheels in order to provide a wide and substantial support for the implement; and this base includes a front axle 1 and its caster wheels 2 together with the rear axle 3 and its pair of caster wheels 4, the axles being spaced apart a suitable distance and arranged in parallelism transversely of the implement.

Figure 3:
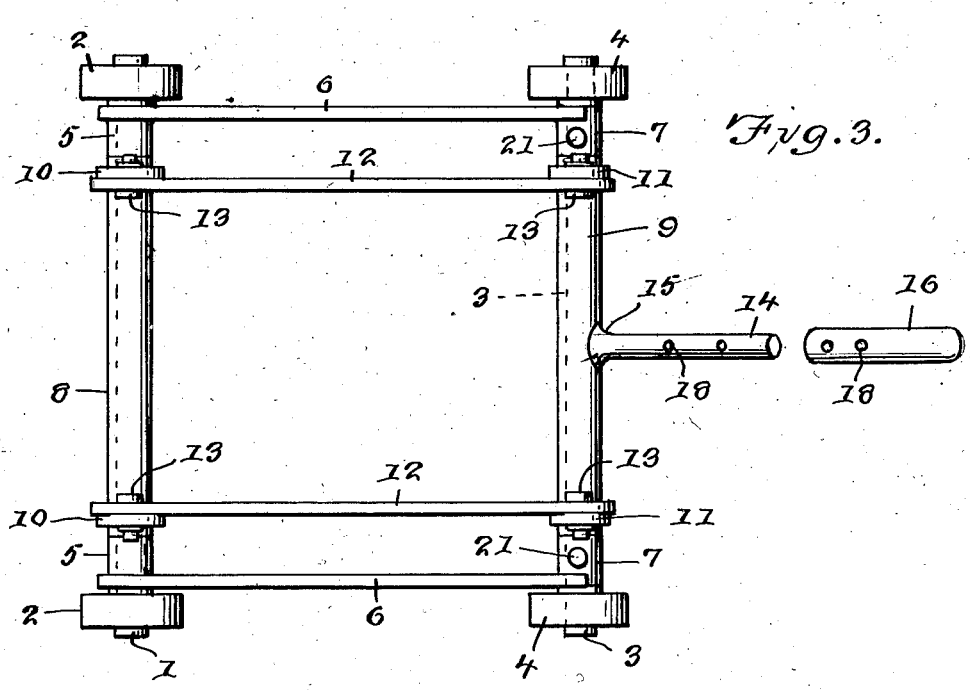
Figure 3 is a top plan view of the dolly in the position of Fig. 2.
Figure 4:
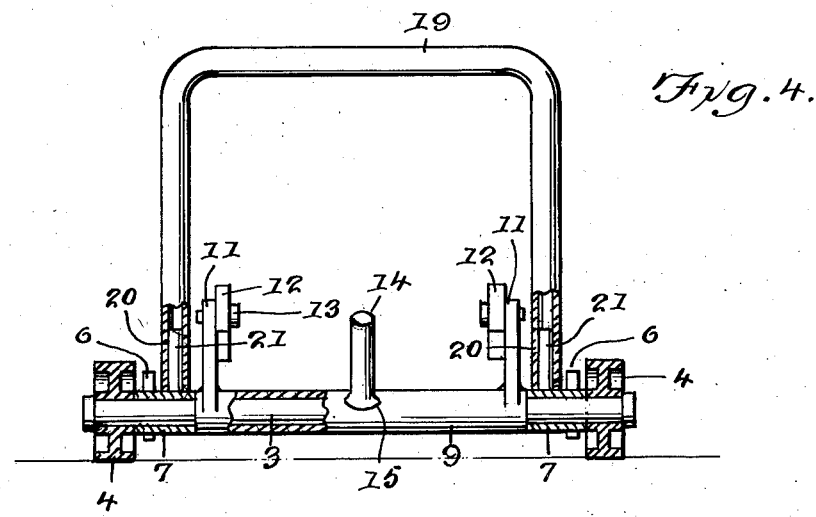
Figure 4 is a detail view partly in section at the handle end or rear end of the dolly.

The axles, which form the transverse members of the rectangular base, are rigidly united by means of longitudinally extending members supported by a pair of bearing bushings 5, 5, or hubs on the front axle, and the two side bars 6, 6, of the base unite the front hubs with similar hubs or bearing bushings 7, 7, mounted on the rear axle. At their ends the side base bars are rigidly united with the bearing bushings, as by welding, and as indicated in the plan view Fig. 3, the axles and the side bars provide a wide and substantial base for the caster wheels of the implement.

Between the pair of bushings 5, 5, and 7, 7, are mounted a pair of tubular sleeves 8 and 9 that separate the side members of the base and maintain them in proper relative positions, and these sleeves are mounted to rock on the spaced axles 1 and 3 and form part of the adjustable elevating and lowering frame of the implement.

The front sleeve is fashioned with a pair of lever arms 10, 10, at its opposite ends, and the rear sleeve is also equipped with a pair of lever arms 11, 11, at its opposite ends, the arms being welded or otherwise rigidly secured to the sleeves to rock with the sleeves on the axles.

The lever arms, in pairs, are connected by parallel wheel-supporting arms 12, 12, that are pivotally connected at 13, 13, to the ends of the arms, and it will be apparent that by rocking the sleeves on the axles the load-supporting arms, constantly in horizontal position, may be elevated or lowered, as desired.

For rocking the load supporting frame and elevating and lowering the supporting bars, the rear sleeve is provided with a radially arranged stud-pin or handle bar 14, welded or otherwise secured to the exterior of the sleeve at 15, and a tubular extension and adjustable handle 16 is adapted to slip over the handle bar and be secured thereto by pins 17 passed through registering holes 18 in the handle bar and tubular handle.

As an abutment or brace, especially useful when handling single wheels, a transversely extending, upright and U-shaped barrier 19 is mounted at the rear or handle end of the dolly, and this barrier is removable in order that it may readily be detached when not needed. The U-shaped barrier may be of tubular form so that its socket ends 20 may be slipped over a pair of upright studs or pins 21 that are welded or otherwise secured to the bushings 7, 7, of the wheel base, and the barrier thus becomes a rigid part of the wheel base.

By thus coupling the front and rear axles in the base frame, a flexibility is provided that enables the dolly to conform to uneven shop floors, or to irregularities in a road-bed; and the dolly may with ease be pushed or pulled by means of its handle into positions for use, and then the supporting frame may be elevated or lowered by manipulating the handle.

Figure 2:
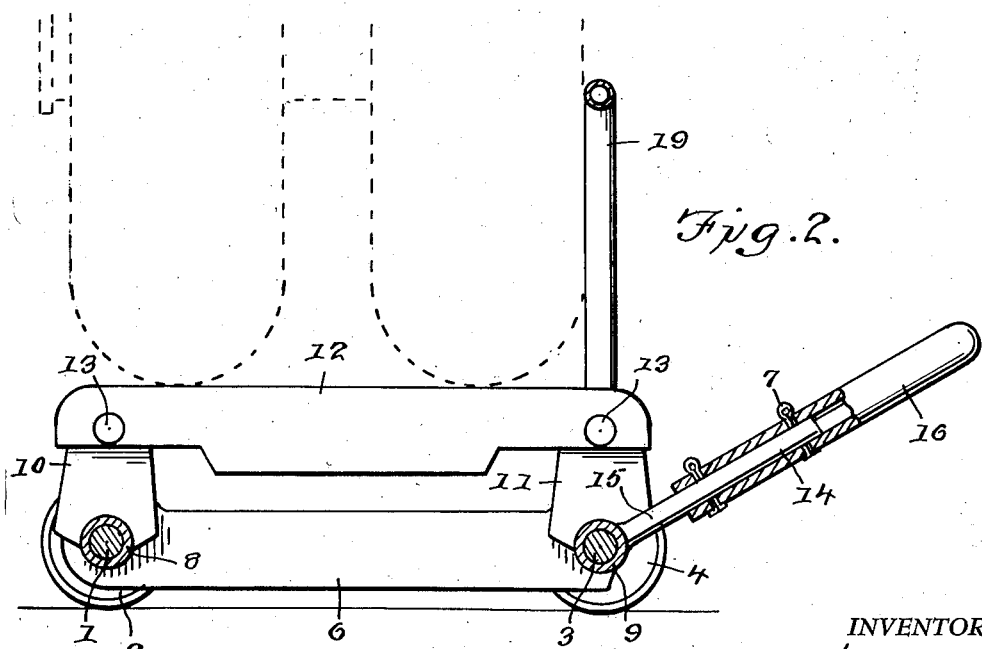
Figure 2 is a view similar to Fig. 1 with the elevating mechanism uplifted and supporting the dotted dual wheels to permit their withdrawal from an axle.

For servicing and handling the dual wheels shown in dotted position, the wheels are first jacked up, as in Fig. 1; the dolly with its elevating frame in lowered position is pushed beneath the wheels, the handle is then swung downwardly to elevate the load supporting arms or bars to position in Fig. 2. In the latter position the dolly has taken the load off the truck wheels so that when the retaining nuts or lugs are loosened, the dolly may be pulled outwardly, carrying the truck wheels, and sliding them off their journal bearings. In the operation of replacing the truck wheels, the steps in manipulating or handling the dolly are reversed, and by means of the dolly the truck wheels are slipped over their journal bearings and affixed thereon, the elevating frame is lowered, and the dolly is then pulled clear of the jacked up truck wheels.

Having thus fully described our invention, what we claim as new and desire to secure by Letters Patent is:

In an implement as described, the combination with a wheeled base including front and rear axles, and a pair of laterally spaced stud-pins rigid with the wheeled base, of a pair of sleeves journaled on the axles, pairs of laterally spaced lever arms rigid with said sleeves, a pair of longitudinally extending load-supporting bars each pivotally connecting a pair of lever arms, a transversely extending vertical U-shaped barrier having socket ends fitted over said stud pins, a lever handle rigid with one of the sleeves, a telescopic extension for said handle and means for locking the extension and handle in selected positions.

ELMO D. SMITH.
KENNETH L. SMITH.

REFERENCES CITED

The following references are of record in the file of this patent:

UNITED STATES PATENTS

| Number | Name | Date |
|---|---|---|
| 599,917 | Schneider et al. | Mar. 1, 1898 |
| 1,360,112 | Hennessy | Nov. 23, 1920 |
| 2,284,275 | Gannett | May 26, 1942 |
| 2,410,902 | Roberts | Nov. 12, 1946 |